United States Patent
Ishikawa et al.

(10) Patent No.: US 12,468,516 B2
(45) Date of Patent: Nov. 11, 2025

(54) EFFECTIVELY DOWNLOADING LARGE FILES FOR VIRTUAL ENVIRONMENT

(71) Applicant: RAKUTEN MOBILE, INC., Tokyo (JP)

(72) Inventors: Takatsugu Ishikawa, Tokyo (JP); Yidao Wang, Tokyo (JP); Makoto Ono, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/927,586

(22) PCT Filed: Aug. 31, 2022

(86) PCT No.: PCT/JP2022/032715
§ 371 (c)(1),
(2) Date: Nov. 23, 2022

(87) PCT Pub. No.: WO2024/047779
PCT Pub. Date: Mar. 7, 2024

(65) Prior Publication Data
US 2024/0281232 A1  Aug. 22, 2024

(51) Int. Cl.
*G06F 8/60* (2018.01)
*G06F 9/455* (2018.01)

(52) U.S. Cl.
CPC .............. *G06F 8/60* (2013.01); *G06F 9/455* (2013.01)

(58) Field of Classification Search
CPC ... G06F 8/60; G06F 9/455; G06F 8/65; G06F 8/61
See application file for complete search history.

(56) References Cited

U.S. PATENT DOCUMENTS

| | | | | |
|---|---|---|---|---|
| 11,606,245 | B1* | 3/2023 | Masjuan | H04L 67/51 |
| 2004/0064523 | A1* | 4/2004 | Zhang | H04L 69/329 709/217 |
| 2015/0301852 | A1* | 10/2015 | Obata | G06F 8/61 718/1 |
| 2017/0357551 | A1* | 12/2017 | Zacks | G06F 11/1448 |
| 2021/0072978 | A1* | 3/2021 | Nakazawa | G06F 12/0802 |
| 2022/0147378 | A1* | 5/2022 | Tarasov | G06F 16/196 |
| 2022/0150322 | A1* | 5/2022 | Ikeda | G06F 16/9566 |
| 2022/0337417 | A1* | 10/2022 | Sanders | H04L 67/34 |

FOREIGN PATENT DOCUMENTS

JP   2022-076475 A   5/2022

* cited by examiner

*Primary Examiner* — Wei Y Zhen
*Assistant Examiner* — Amir Soltanzadeh
(74) *Attorney, Agent, or Firm* — Sughrue Mion, PLLC (57) ABSTRACT

A virtual environment system comprises one or more processors. At least one of the processors executes a process of downloading, by a first Pod of a plurality of Pods, a file from a first download path written in a management file. At least one of the processors executes a process of, when a description indicating that the file has been downloaded to any of the plurality of Pods is not included in the management file, changing, by the first Pod, a second download path written in the management file to a path of the first Pod in which the file is stored. At least one of the processors executes a process of downloading, by a second Pod different from the first Pod of the plurality of Pods, the file from the first Pod by referring to the management file.

13 Claims, 9 Drawing Sheets

EFFECTIVELY DOWNLOADING LARGE FILES FOR VIRTUAL ENVIRONMENT

CROSS REFERENCE TO RELATED APPLICATIONS

This application is a National Stage of International Application No. PCT/JP2022/032715 filed Aug. 31, 2022.

TECHNICAL FIELD

The present disclosure relates to effectively downloading large files for a virtual environment.

In recent years, in communication network systems, network services using virtualization technology, etc. have begun to be provided. The network services are often constructed in a virtual environment (deployment environment of Virtual Network Function (VNF)) of small-scale facilities (facilities are also referred to as nodes in communication networks) that are close to end users, with consideration of delay to the end users.

The small-scale facilities do not have enough space to store large files, and thus the files necessary to provide services to the users are downloaded from storages provided in large-scale facilities.

CITATION LIST

Patent Literature

Patent Document 1: JP 2022-076475 A

SUMMARY OF INVENTION

Technical Problem

Meanwhile, virtual environment systems that construct virtual environments by using open source software for container management, represented by Kubernetes®, manage virtual environments, such as containers, in units called Pods. The files that are necessary for providing services to the users are downloaded for each Pod. In other words, in a virtual environment system of a small-scale facility, a necessary file is downloaded for each Pod from a storage provided in a large-scale facility. This creates a circumstance in which the same large file is downloaded repeatedly to the same small-scale facility, which makes it inefficient. In addition, even when the file is updated, each Pod will access the large-scale facility, and each Pod will download the same large file to the small-scale facility.

The present disclosure was made in view of the circumstances described above, and relates to effectively downloading large files for a virtual environment.

Solution to Problem

According to an embodiment of the present disclosure, a virtual environment system includes one or more processors. At least one of the one or more processors executes a process of downloading, by a first Pod of a plurality of Pods that is capable of managing one or more virtual environments, a file from a first download path written in a management file. At least one of the one or more processors executes a process of, when a description indicating that the file has been downloaded to any of the plurality of Pods is not included in the management file, changing, by the first Pod, a second download path written in the management file to a path of the first Pod in which the file is stored. At least one of the one or more processors executes a process of downloading, by a second Pod different from the first Pod of the plurality of Pods, the file from the first Pod by referring to the management file.

According to an embodiment of the present disclosure, a management method of a virtual environment system includes a process of downloading, by a first Pod of a plurality of Pods that is capable of managing one or more virtual environments, a file from a first download path written in a management file. The management method includes a process of, when a description indicating that the file has been downloaded to any of the plurality of Pods is not included in the management file, changing, by the first Pod, a second download path written in the management file to a path of the first Pod in which the file is stored. The management method includes a process of downloading, by a second Pod different from the first Pod of the plurality of Pods, the file from the first Pod by referring to the management file.

According to an embodiment of the present disclosure, a non-transitory computer-readable medium records a program. The program causes a process of downloading, by a first Pod of a plurality of Pods that is capable of managing one or more virtual environments, a file from a first download path written in a management file to be executed. The program causes a process of, when a description indicating that the file has been downloaded to any of the plurality of Pods is not included in the management file, changing, by the first Pod, a second download path written in the management file to a path of the first Pod in which the file is stored to be executed. The program causes a process of downloading, by a second Pod different from the first Pod of the plurality of Pods, the file from the first Pod by referring to the management file to be executed.

DESCRIPTION OF EMBODIMENTS

Hereinafter, embodiments according to the present disclosure will be described with reference to the attached drawings. The embodiments described below are exemplary and the present disclosure is not to be construed as being limited by these descriptions.

Before describing a virtual environment system and a management method of a virtual environment according to one embodiment, an existing communication network system will be described first.

Figure 1:
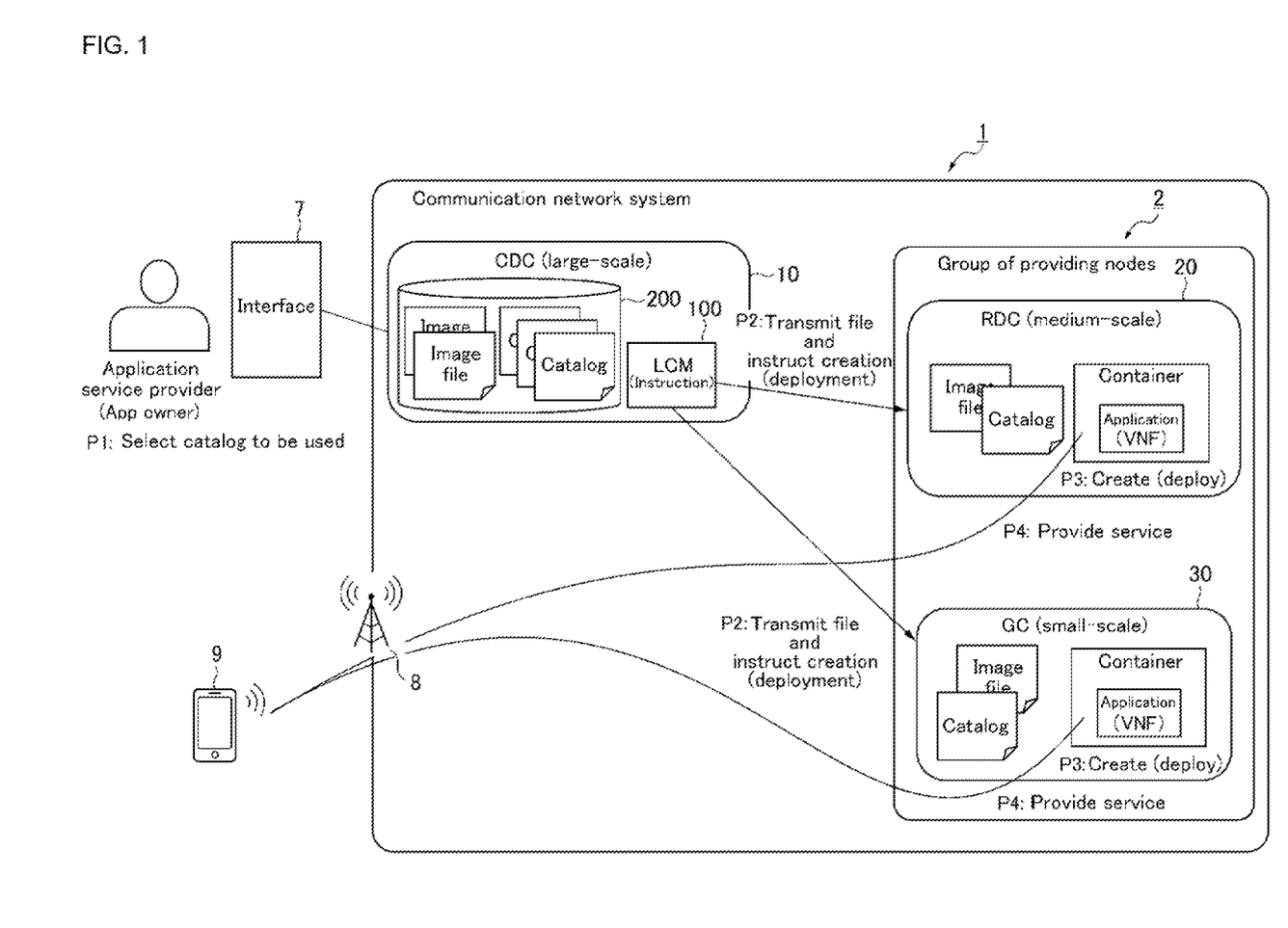
FIG. 1 is a conceptual diagram that illustrates an existing communication network system.

FIG. 1 is a conceptual diagram that illustrates an existing communication network system. In FIG. 1, it is anticipated that communication between a communication network system 1 and an information processing device 9 are performed.

The information processing device 9 may be a mobile device such as a smartphone or may be a fixed device.

Note that FIG. 1 illustrates a base station 8. This indicates that when the information processing device 9 is a mobile device, the information processing device 9 connects to and communicates with the communication network system 1 via the base station 8, which transmits radio waves for radio communication. The communication between the information processing device 9 and the communication network system 1 can be wired communication, and in this case, it is not necessary for there to be a base station 8.

The communication network system 1 includes a Central Data Center (CDC) 10, and the CDC 10 contains a function for preforming control, etc., of a communication network such as an orchestrator (not shown). Therefore, the CDC 10 can be said to be a node (control node) which, among the communication nodes constituting the communication network system 1, is responsible for control.

The CDC 10 is a large-scale facility (e.g., a central data center). It is anticipated that only a few locations in a wide area have such a large-scale facility. For example, there may be large-scale facilities in only a few locations in a range such as a country or a large state. For example, in Japan, when divided into two regions—East Japan and West Japan—there may be only one CDC 10 in each region.

An orchestrator is a system that is responsible for execution, management, repair, etc., of functions executed in the communication network system 1 such as a network slice.

There is a lifecycle manager (LCM) 100 in the orchestrator. The LCM 100 manages applications such as a virtualized network function (VNF) constructed in a group of providing nodes 2. Note that the LCM 100 may be a single device, or a system configured from a plurality of devices.

An application such as a Virtual Network Function (VNF) is used to implement a network service that is provided to the information processing device 9 by the communication network system 1. The CDC 10 stores a file for executing an application. The file may be stored in a storage 200 within the CDC 10 or may be held by the orchestrator. The file may be, for example, a java component that is executed in a virtual environment, or an image file for generating a virtual environment, such as a container, for implementing the application. Note that an image file that generates a container is also called a container image. A Docker image is one example thereof. Moreover, the file may be a file called a catalog (also called a catalog file or a bundle catalog) that contains application configuration information. Note that the image file may be included in the catalog.

The communication network system 1 includes a group of providing nodes 2 configured from one or more providing nodes. A providing node indicates a server or a system in which applications for providing various services to the information processing device 9 via the communication network system 1 can be deployed. More specifically, the providing nodes can construct virtual environment such as containers, and the applications are deployed as VNFs on the virtual environment. In other words, VNFs that implement applications are generated in the virtual environment on each providing node.

Note that each providing node of the group of providing nodes 2 may be independent of each other. That is, one or more providing nodes of the group of providing nodes 2 may be managed by a vendor separate from the communication network system 1. Moreover, the providing nodes managed by the vendor separate from the communication network system 1 may be placed outside the communication network system 1.

In FIG. 1, each providing node of the group of providing nodes 2 is contained in an RDC 20 or a Group Center (GC) 30. Note that although FIG. 1 shows one RDC and one GC, the number of the RDCs and the GCs in the communication network system 1 is not particularly limited.

The RDC 20 is a medium-scale facility (e.g., a regional data center) and exists, for example, in each regional level such as a prefecture.

The GC 30 is a small-scale facility (e.g., a facility corresponding to a group of base stations) that is directly connected to each base station and that is close to users using the communication service.

FIG. 1 also illustrates an interface 7. This indicates that an application service provider that desires to generate an application in a providing node to provide a service by means of the application can request, via the interface 7, the communication network system 1 to generate the application.

The procedure for deploying an application in the existing communication network system 1 is described briefly with reference to FIG. 1.

First, the application service provider selects a catalog used for generating an application based on the functions, etc. of the application, via the interface 7 of the communication network system 1 (see reference sign P1).

The LCM 100 selects one providing node, from the group of providing nodes 2, that constructs a virtual environment, based on the selected catalog and available resources of the providing nodes, etc. Hereinafter, the selected providing node (that is, the application execution environment) is called a "deployment destination". As a deployment destination, a providing node in the RDC 20 may be selected or a providing node in the GC 30 may be selected. In addition, the facility (the RDC 20 or the GC 30) itself where the deployment destination providing node exists may also be called a "deployment destination".

FIG. 1 illustrates both cases where the deployment destination is in the RDC 20 and where the deployment destination is in the GC 30. In many cases, the providing node in the GC 30 is selected as the deployment destination rather than the providing node in the RDC 20.

The LCM 100 then transmits to the deployment destination a catalog and an image file used to generate a virtual environment for implementing the application. Then, the LCM 100 instructs the generation of the virtual environment (see reference sign P2).

The deployment destination deploys a VNF in accordance with a request. That is, the VNF is generated on a container of the deployment destination (see reference sign P3).

A user trying to use a network service accesses the communication network system 1 by means of the information processing device 9 and then enjoys the network service connected to the VNF in the deployment destination. That is, the generated VNF provides the service (see reference sign P4).

Figure 2:
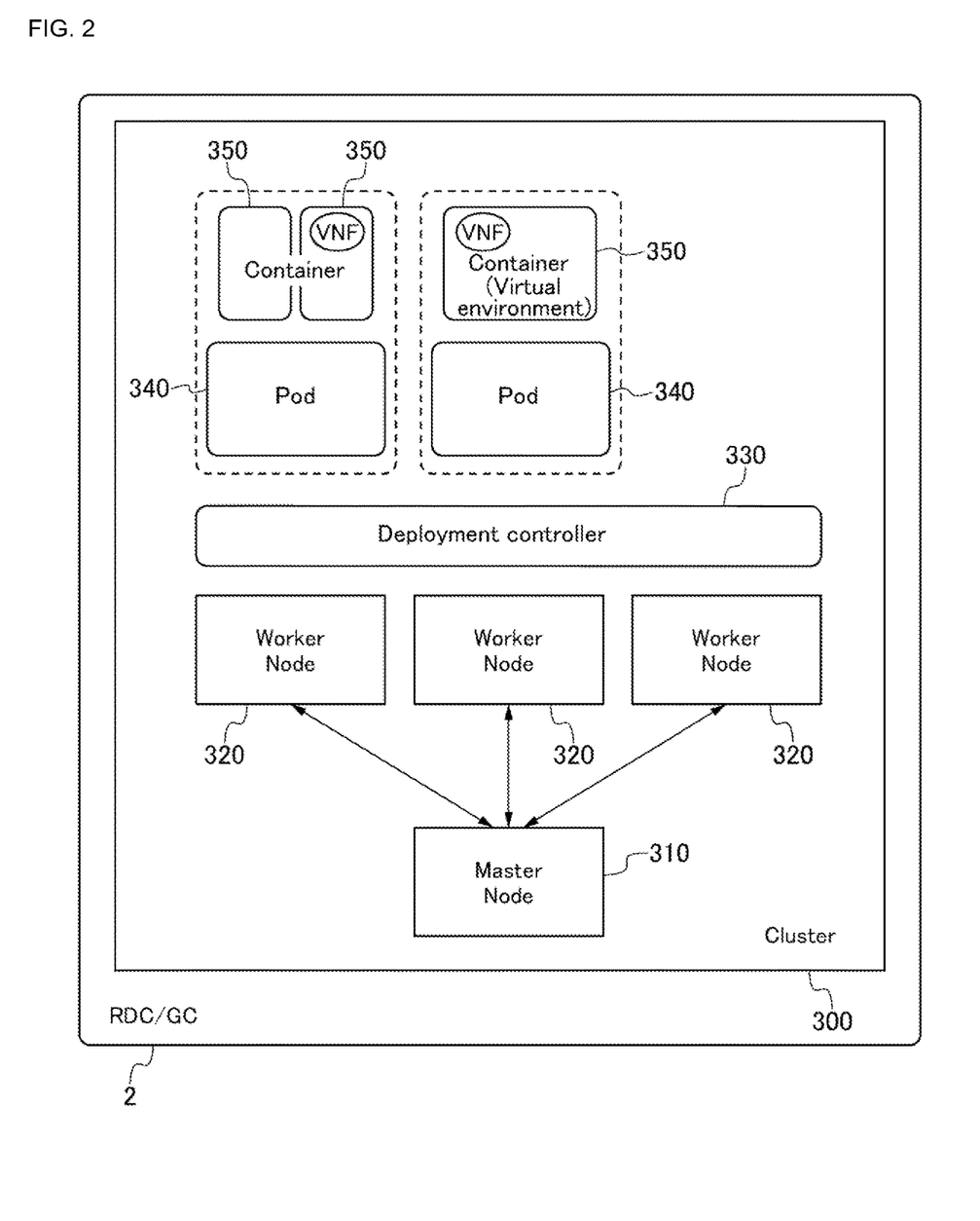
FIG. 2 is a diagram that illustrates an example of creating an existing virtual environment.

Next, the existing virtual environment system for constructing the virtual environment mentioned above will be described with reference to FIG. 2. FIG. 2 illustrates one example of a configuration of a virtual environment system 300 for constructing a virtual environment using an OSS for managing containers, represented by Kubernetes. The virtual environment system 300 is a cluster for executing containerized applications. In Kubernetes, an assembly of master node and worker nodes having different roles form a cluster. The master node manages the worker nodes, and the cluster includes at least one master node and one or more worker nodes. FIG. 2 illustrates a cluster including one master node 310 and three worker nodes 320.

In Kubernetes, a virtual environment is managed in units called Pods. FIG. 2 illustrates an example in which the virtual environment system 300 includes two Pods 340. The Pods 340 operate on the worker nodes 320.

A deployment controller 330 performs control, such as activation and suspension, over the Pods 340.

In the example of FIG. 2, each Pod 340 has one or more containers 350. The containers 350 are virtual environments for implementing VNF. The Pods 340 also include a shared storage (not shown). The shared storage is a storage that can be shared by multiple containers managed by one Pod 340. The Pods 340 include a networking function. In addition, the Pods 340 can be designated with an IP address and a MAC address unique to the Pod. The Pods 340 include information regarding how to operate each container, such as an image file version and ports that are to be used.

In the existing virtual environment system 300 configured as described above, the Pods 340 download a file from the CDC 10 (see FIG. 1) for each Pod 340.

Next, the downloading of the files in the existing virtual environment system 300 will be additionally described with reference to FIG. 3.

Figure 3:
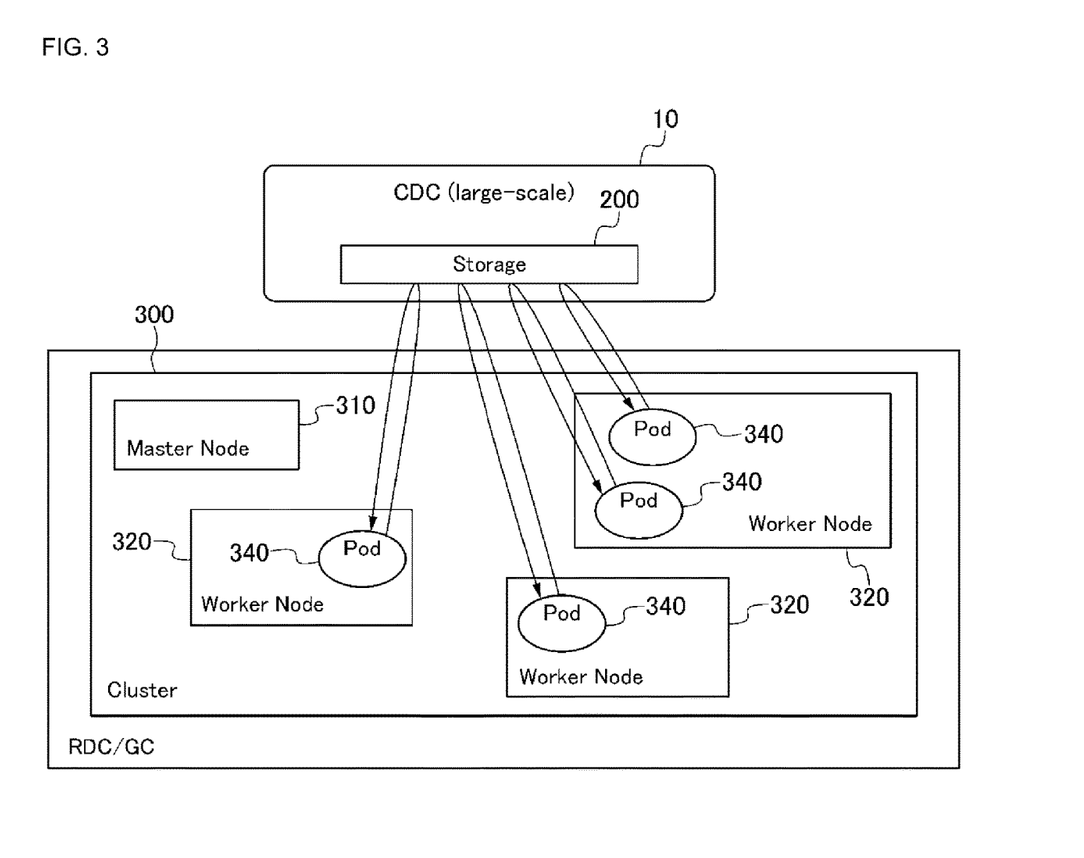
FIG. 3 is a diagram that illustrates downloading a file in a virtual environment system.

FIG. 3 illustrates how the Pods 340 download the file for each Pod 340 from the storage 200 within the CDC 10. Therefore, as described above, the same file may be downloaded repeatedly to the same RDC or GC (RDC/GC), which makes it inefficient. Moreover, a plurality of Pods 340 may access the CDC 10 in order to download the same file. FIG. 3 illustrates an example in which four Pods 340 in the same RDC or GC access the CDC 10, thereby downloading the same file four times to the RDC or the GC.

Figure 4:
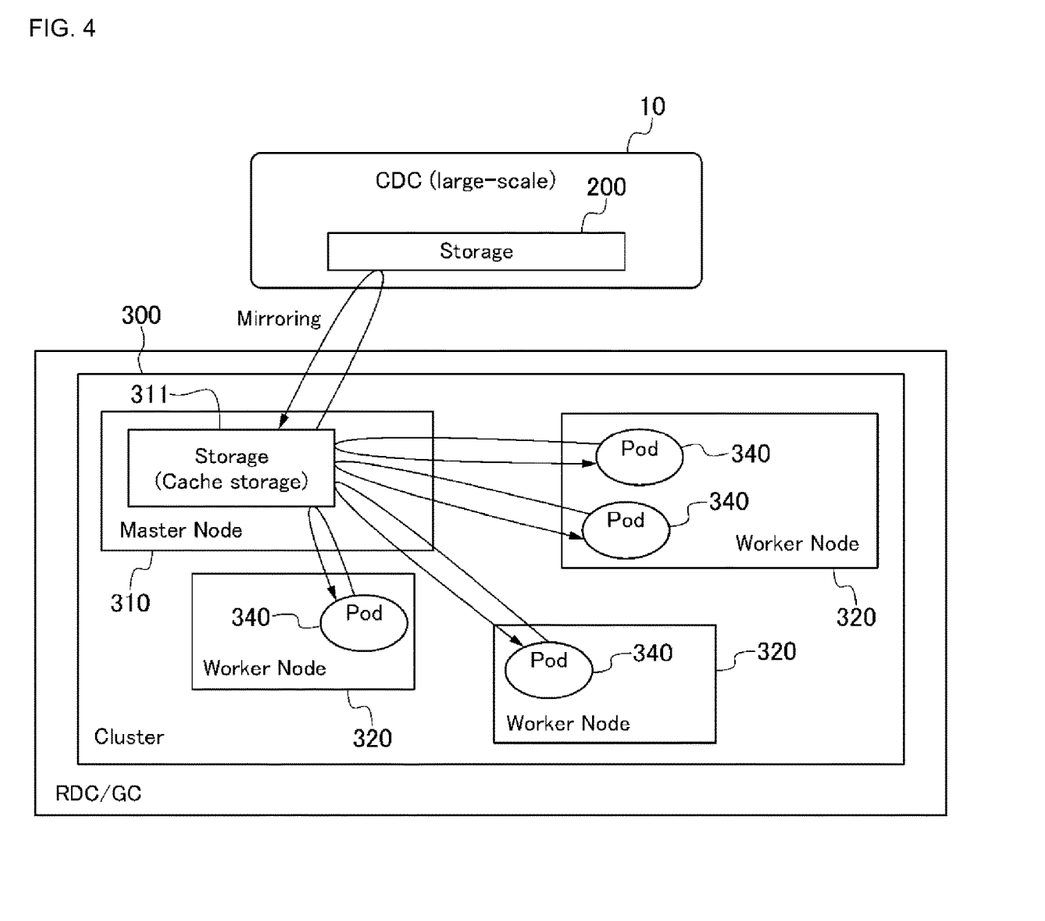
FIG. 4 is a diagram that illustrates downloading a file in a virtual environment system.

In order to avoid downloading the same file from the CDC 10 multiple times, the master node 310 may download the file, as a representative, from the storage 200 within the CDC 10, as shown in FIG. 4. The master node 310 may store the file downloaded from the storage 200 within the CDC 10 in its own storage 311, and each Pod 340 may download that file from the storage 311 within the master node 310. However, as described above, there are many types of files, so in a small-scale GC 30, it may be difficult to store all the files in the master node 310.

In contrast, in the virtual environment system according to the present embodiment, each Pod downloads a necessary file from the Pod in the worker node. The virtual environment system according to the present embodiment is described below.

Figure 5:
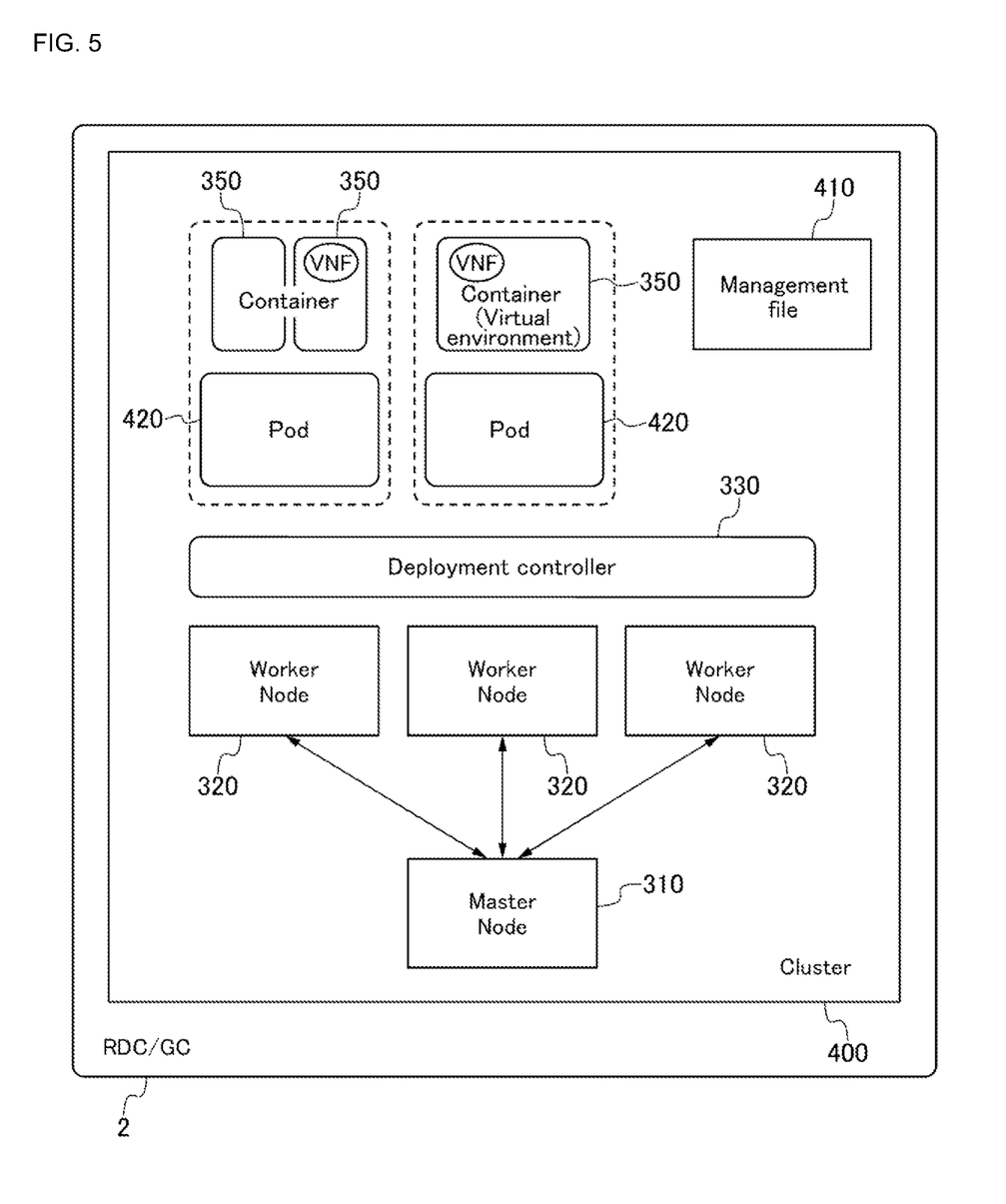
FIG. 5 is a diagram that illustrates one example of a configuration of a virtual environment system according to one embodiment.

The virtual environment system 400 according to the present embodiment can be implemented, for example, by using an open source software for managing containers, represented by Kubernetes. FIG. 5 shows one example of the configuration of the virtual environment system 400 according to the present embodiment. Note that in FIG. 5, the same reference signs are given to the same parts as in FIG. 2, and a detailed description thereof is omitted.

The virtual environmental system 400 is configured at a medium or a small-scale communications facility such as the RDC 20 or the GC 30 described above. In the same manner as the existing virtual environment system 300, the virtual environment system 400 may be implemented by a cluster including master nodes and worker nodes. In the virtual environment system 400 according to the present embodiment, a management file 410 clearly shown in FIG. 5 is used such that each Pod can acquire a file in a manner different from the existing embodiment. Therefore, in FIG. 5, the reference sign of the Pods is changed to 420. Note that the management file 410 may be stored anywhere as long as it can be referred to from each Pod 420.

Figure 6:
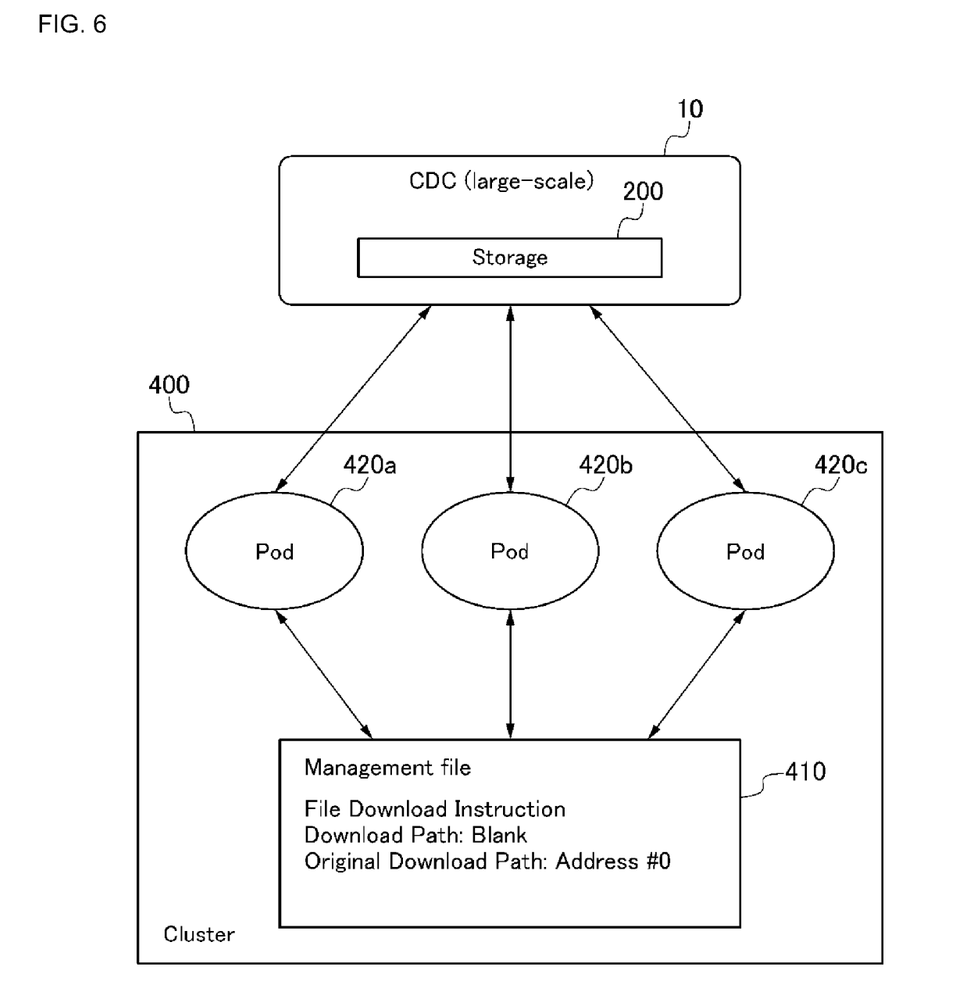
FIG. 6 is a diagram that illustrates one example of a configuration of a virtual environment system according to an embodiment.

Note that in the following description, the virtual environment system 400 according to the present embodiment will be described with reference to FIG. 6 instead of FIG. 5. FIG. 6 illustrates a configuration in which only the management file 410 and the plurality of Pods 420 are extracted from the configuration of the virtual environment system 400 illustrated in FIG. 5. Note that in FIG. 6, the CDC 10 (see FIG. 1) is illustrated in addition to the virtual environmental system 400.

FIG. 6 illustrates an example in which the virtual environment system 400 includes three Pods 420a, 420b, and 420c. There is no particular limitation on the number of Pods 420. Hereinafter, matters common to the Pods 420a, 420b, and 420c will be described by being indicated as Pods 420. As described above, the Pods 420 operate on the same or different worker node in the cluster.

The management file 410 enables downloading a file used by each Pod 420 (hereinafter simply referred to as a "file"). The file is anticipated to be a file used for constructing a virtual environment and a file used for a function executed under the constructed virtual environment, but it is not particularly limited. For example, the file may be a catalog or an image file described above. In Kubernetes, the management file 410 may be created, for example, as a lock object.

The management file 410 includes at least the following information (1), (2), and (3).
 (1) File Download Instruction
 (2) Download Path (second download path)
 (3) Original Download Path (first download path)

The "File Download Instruction" includes an instruction that instructs the Pods 420 to download a file from a "Download Path". In addition, if the "Download Path" is Blank, the "File Download Instruction" includes an instruction that instructs the Pods 420 to download the file from an "Original Download Path".

Both the Download Path and the Original Download Path are paths for each Pod 420 to download a file. The initial setting for the "Download Path" is "Blank". Note that the initial setting for the "Download Path" may be the same as that of the "Original Download Path". The "Original Download Path" is used when none of the Pods 420 has a file. In such a case, for example, a path of the file stored in the storage 200 within the CDC 10 can be registered as the "Original Download Path".

Each Pod 420 periodically refers to the management file 410 to download a file from the "Download Path" in the management file 410 in accordance with the "File Download Instruction" in the management file 410. When the "Download Path" is "Blank", each Pod 420 downloads a file from the "Original Download Path". That is, each Pod downloads a file from the CDC 10.

Note that, as discussed below, when the "Download Path" is a path to any of the plurality of Pods 420 in the cluster, it means that the file has been downloaded to any of the Pods 420 in the cluster.

Upon downloading a file, each Pod 420 stores the file in its own shared storage. The shared storage is a storage that can be shared by multiple containers managed by one Pod 420.

The Pod 420 that downloaded a file from the "Original Download Path" changes the "Download Path" in the management file 410 to its own path. As a result, the "Download Path" is no longer a Blank, so thereafter, the file is downloaded from the "Download Path" instead of the "Original Download Path". Hereinafter, it will be explained that the Pod 420b downloads a file from the "Original Download Path". Upon downloading a file from the "Original Download Path", the Pod 420b changes the "Download Path" in the management file 410 to a path of the Pod 420b. For example, an IP address or a MAC address of the Pod 420b may be used for the path.

In this manner, the Pods 420 that downloaded a file from the "Original Download Path" changes the "Download Path" to its own path. This causes the management file 410 to contain a description indicating that the file has been downloaded to any of the plurality of Pods 420.

In the description below, a Pod 420 that has changed the "Download Path" in the management file 410 to its own path is called a "Leader Pod". A Pod 420 that has already downloaded a file from the "Original Download Path" can become a Leader Pod.

Figure 7:
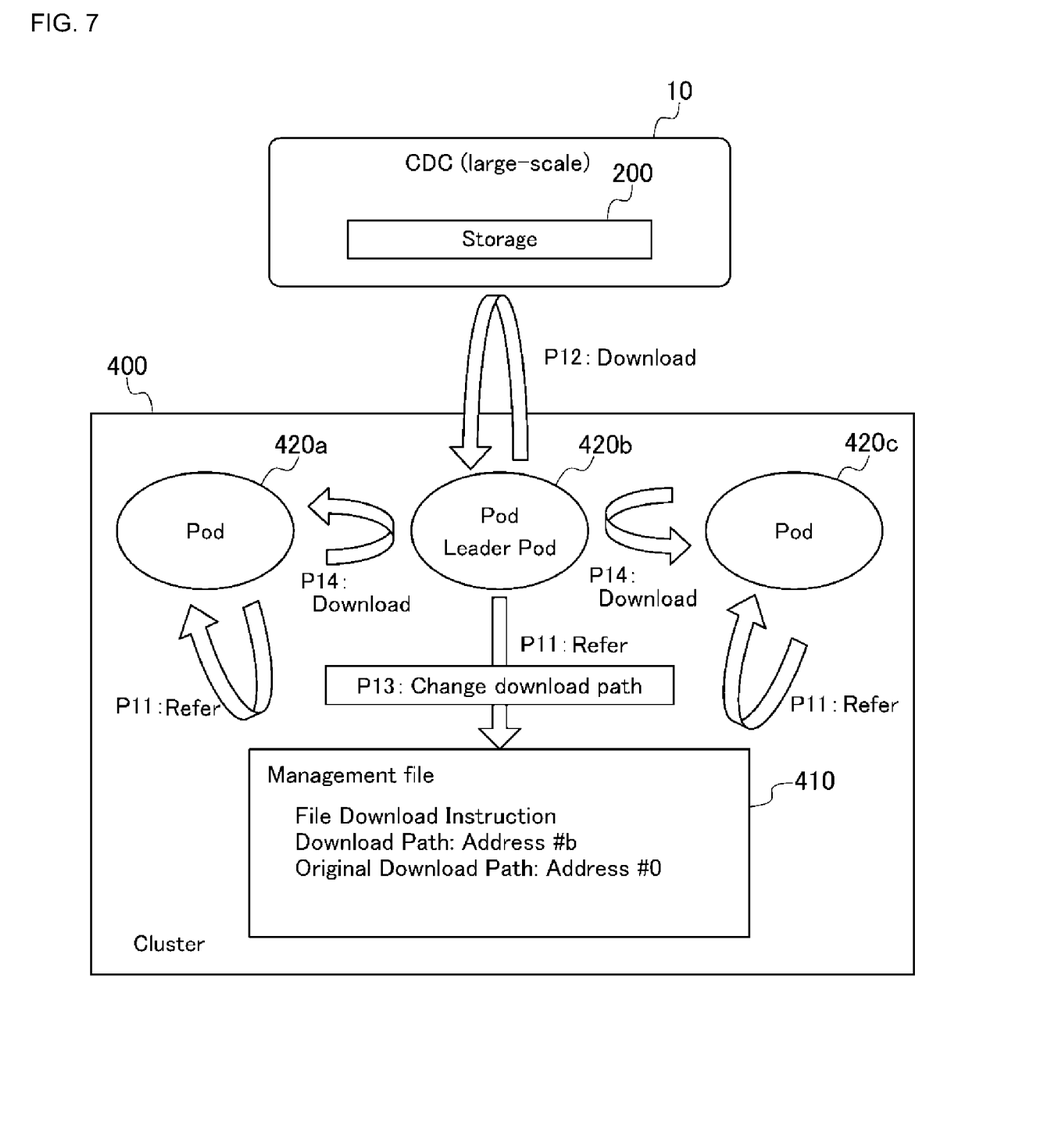
FIG. 7 is a diagram that illustrates downloading a file in a virtual environment system according to an embodiment.

Next, updating of the management file 410 will be described with reference to FIG. 7. Note that in FIG. 7, the same reference signs are given to the same parts as in FIG. 6.

As described above, the Pods 420 refer to the management file 410 (see reference sign P11). When the "Download Path" in the management file 410 is "Blank" or an "Original Download Path", the Pod 420 that referred to the management file 410 downloads a file from the CDC 10. When the "Download Path" in the management file 410 is "Blank" or an "Original Download Path", this indicates that a file has not been downloaded to any of the plurality of Pods 420. Meanwhile, when the "Download Path" has a path written therein that is different from "Blank" or an "Original Download Path", this indicates that a file has been downloaded to any of the plurality of Pods 420.

When the management file 410 does not contain a description indicating that a file has been downloaded to any of the plurality of Pods 420, the Pod 420 that referred to the management file 410 downloads a file from the CDC 10 (see reference sign P12).

The Pod 420 that has already downloaded the file becomes a Leader Pod, and said Pod changes the "Download Path" to its own path (see reference sign P13). As a result, the path of the Leader Pod 420 is set in the "Download Path" in the management file 410. FIG. 7 illustrates that the Pod 420b is the Leader Pod, and that the Pod 420b changed the "Download Path" to "Address #b", which is an IP address of the Pod 420b (see reference sign P13).

The Pods 420a, 420c that referred to the management file 410 after the change download the file from the Pod 420b (see reference sign P14). Therefore, the Pods 420a, 420c can download the file from the Leader Pod (Pod 420b) and no longer need to access the Original Download Path, thereby reducing access to the CDC 10 from the Pods 420 in the cluster. As a result, repeatedly downloading the same large file from the CDC 10 to the Pods 420 can be prevented.

Note that the management file 410 may further include the following information (4) and (5).
(4) Updated Time
(5) Interval Duration The "Updated Time" indicates the time when the Leader Pod accessed the management file 410 (hereinafter also referred to as an "Access Time").

The "Interval Duration" indicates, as discussed below, a time interval in which the Leader Pod can be considered to be operating normally from the last time it accessed the management file 410.

Figure 8:
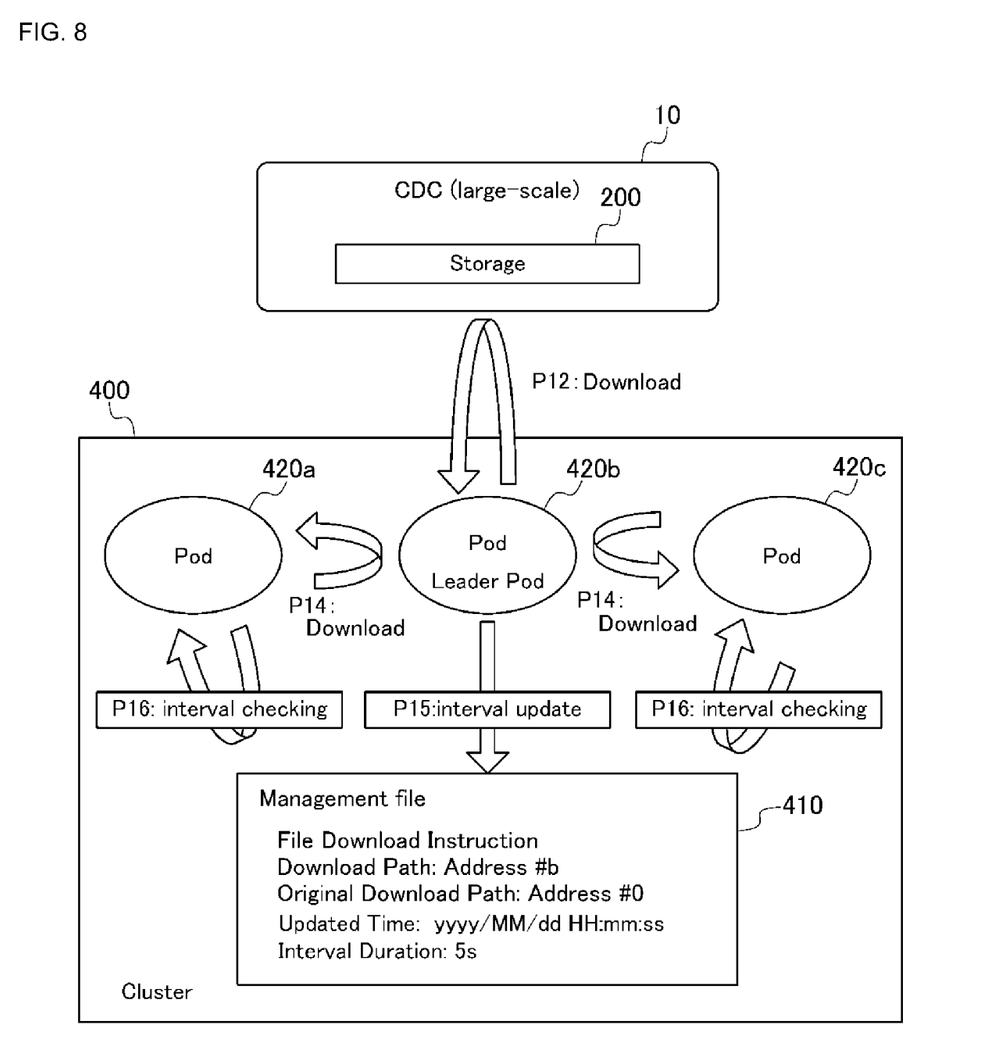
FIG. 8 is a diagram that illustrates downloading a file in a virtual environment system according to an embodiment.

Processing at each Pod 420 when the management file 410 including information (4) and (5) is used will be described with reference to FIG. 8. Note that in FIG. 8, the same reference signs are given to the same parts as in FIG. 6 and FIG. 7.

The Pod 420b, which is the Leader Pod, updates the "Updated Time" each time it accesses the management file 410 (see reference sign P15).

The Pods 420a, 420c, which are not the Leader Pod, periodically refer to the management file 410 (see reference sign P16). For example, the management file 410 may be referred to at a timing in which a time specified in the "Interval Duration" has elapsed from the previous time the management file 410 was referred to.

When the Pods 420a, 420c, which are not the Leader Pod, refer to the management file 410, the "Updated Time" and the "Interval Duration" are used to determine whether or not the Pod 420b, which is the Leader Pod, is operating normally. Specifically, upon setting the time elapsed from the "Updated time" to the "Interval Duration" as a time limit, when the present time has passed this time limit, the Pods 420a, 420c determine that the Pod 420b, which is the Leader Pod, is not operating normally. If the present time has passed the time limit, the Pods 420 set the "Download Path" to "Blank" or "Original Download Path". This avoids unnecessary access from the Pods 420a, 420c to the Leader Pod which is assumed to be not operating normally due to a failure, etc.

Moreover, as described above, since the "Download Path" is set to "Blank" or "Original Download Path", the file is downloaded from the "Original Download Path" by any of the plurality of Pods 420. Then, the Pod 420 that downloaded the file from the "Original Download Path" becomes a new Leader Pod, and the other Pods 420 can now download the latest file from the new Leader Pod.

As described above, the Pod 420 that became the new Leader Pod changes the "Download Path" to its own path, and updates the "Updated Time", wherein the time when the file was downloaded is the "Updated time".

The "Interval Duration" may be set in accordance with the frequency of failure occurrences in the Pods 420 and the quality demanded for network services. For example, the "Interval Duration" may be set to be shorter for an environment in which failures occur more frequently.

File Version Management

Note that the virtual environment system 400 according to the present embodiment may manage the version of the file by a first, a second, or a third method described below.

In a Pull method, which is the first method, the management file 410 further includes the following information (6) and (7).
(6) File Version Confirmation Instruction
(7) File Version A "File Version Confirmation Instruction" includes instructing the Leader Pod to confirm the version of the file with the "Original Download Path". Note that the "File Version Confirmation Instruction" may include a time interval for confirming the file version or an instruction for specifying a timing.

The Leader Pod inquires the "Original Download Path" for the version of the file and confirms the latest version. When the version of the stored file is older than the latest version of the file in the "Original Download Path", the Leader Pod downloads the latest version of the file from the "Original Download Path". This ensures that the file stored in the shared storage within the Leader Pod is kept at the newest version.

When the latest version of the file is downloaded, the Leader Pod updates the "File Version" in the management file 410 to the latest version.

In a Push method, which is the second method, a transmission server of the "Original Download Path" (transmission server of the CDC 10) transmits the latest version to the virtual environment system 400 each time the version of the file is updated. At this time, the transmission server transmits, together with the latest version of the file, a Leader Pod Setting Instruction to the virtual environment system 400 (cluster).

When the gateway of the virtual environment system 400 receives the Leader Pod Setting Instruction, it transfers the latest version of the file and the Leader Pod Setting Instruction to any of the Pods in the virtual environment system 400 (within the cluster). The transfer destination may be any Pod 420 within the cluster.

The Pod 420 that received the latest version of the file and the Leader Pod Setting Instruction stores the latest version of the file in its own shared storage and becomes a Leader Pod. As described above, the Pod 420 that has become the Leader Pod changes the "Download Path" in the management file 410 to its own path. In addition, the Leader Pod updates the "File Version" in the management file 410.

In the first method, even when the version of the file in the Original Download Path is not changed, the Leader Pod may inquire the Original Download Path to confirm the version of the file. In contrast, in the second method, when the version of the file in the Original Download Path is changed, the latest version is transmitted from the transmission server of the CDC 10. This eliminates the need for the Pod 420 to inquire the Original Download Path in order to confirm the latest version of the file.

In the third method, the management file 410 includes information (4) indicated above and information (8) indicated below, and the virtual environment system 400 uses these pieces of information (4) and (8) to manage the version of the file.

(4) Updated Time
(8) File Interval Duration

Specifically, when referring to the management file 410, the Pods 420 use the "Updated Time" and the "File Interval Duration" to confirm the expiration time of the file. The expiration time may be the amount of time that has elapsed from the "Updated time" by the "File Interval Duration".

When the present time has passed the expiration time, the Pods 420 do not download a file from the "Download Path", but download a file from the "Original Download Path". That is, when the present time has passed the expiration time, the Pods 420, regarding the file stored in the "Download Path" to be old, download the file from the "Original Download Path".

Thus, in the third method, when the present time has passed the expiration time, the file is downloaded from the "Original Download Path" by any of the plurality of Pods 420. Then, the Pod 420 that has downloaded the file from the "Original Download Path" becomes a new Leader Pod. Thereafter, as described above, the Pods 420 can download the latest file from the new Leader Pod, so downloading the old version of the file from the previous Leader Pod can be avoided.

As described above, the Pod 420 that has become the new Leader Pod changes the "Download Path" to its own path, and updates the "Updated Time", wherein the time when the file was downloaded is the "Updated time". The "File Interval Duration" may be set in accordance with the file update interval.

Therefore, the virtual environment system 400 according to the present embodiment can manage the version of the file by using the first, the second, or the third method described above. The Pods 420 other than the Leader Pod download the file from the Leader Pod when the version of the file downloaded to itself is older than the file version written in the management file 410. This ensures that the file stored in the shared storage in each Pod 420 is kept at the newest version.

Note that a management file 410 may be created for each file required for providing services to a user. That is, when there are different files that are required, a management file 410 may be created for each file that is different. In this case, the Pods 420 make reference to a plurality of management files 410.

Moreover, among the Pods 420 that have already downloaded a file from the Original Download Path, the Pod 420 that downloaded the file first may be the Leader Pod. Alternatively, plurality of Pods 420 that downloaded the file from the "Original Download Path" can consecutively change the "Download Path" to its own path. Further, it may be decided that the Pod 420 that has already downloaded the file from the Original Download Path becomes a Leader Pod only when predetermined requirements are satisfied. Examples of predetermined requirements include requirements such as the Pod has not become a Leader Pod for another file or the number of files of the responsible Leader Pod is less than a predetermined number. That is, even if a Pod 420 has already downloaded a file from the Original Download Path, it does not become a Leader Pod for that file if it has become a Leader Pod for another file. Moreover, even if a Pod 420 has already downloaded a file from the Original Download Path, it does not become a Leader Pod for that file if it has become a Leader Pod for files equal to or more than a predetermined number. This can prevent some of the Pods from becoming a Leader Pod, so the processing described above at the Leader Pod is distributed among the Pods in the cluster, and the usage of the resources of the shared storage of the Pods can be leveled.

Figure 9:
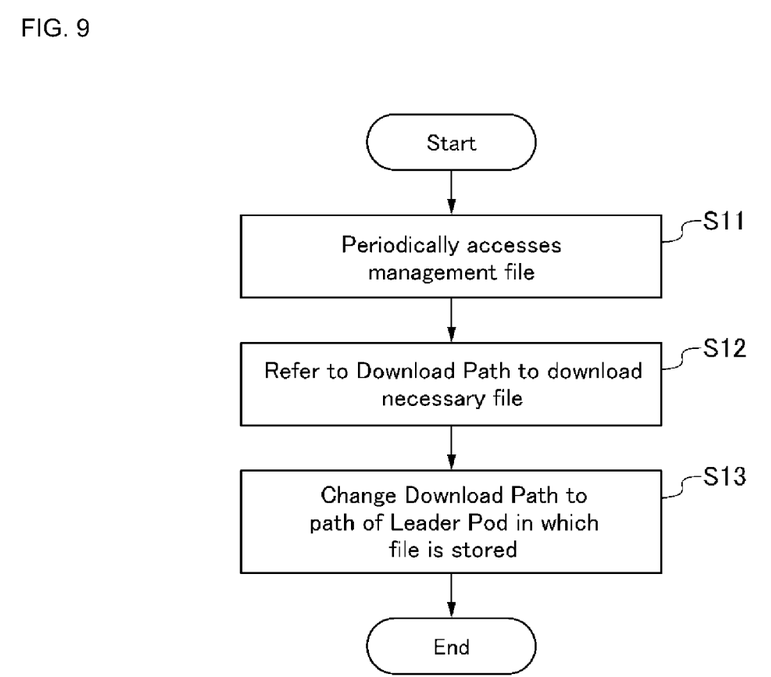
FIG. 9 is a flowchart that illustrates an example of a management method of a virtual environment according to an embodiment.

Next, a management method of a virtual environment according to the present embodiment will be described with reference to FIG. 9. FIG. 9 is a flowchart that illustrates one example of a management method of a virtual environment according to the present embodiment. In the present embodiment, the virtual environment is managed using one or more processors by means of the Pods 420 that manage one or more virtual environments.

The Pods 420 periodically access a management file 410 (S11). The management file 410 includes a Download Path of a file used for constructing a virtual environment or a file used for a function executed under a constructed virtual environment (hereinafter, simply referred to as a "file").

The Pods 420 can ascertain whether or not a file has been downloaded to any of the plurality of Pods 420 by referring to a "Download Path". For example, when the "Download Path" is set to "Blank" or "Original Download Path" of the file, this indicates that the file has not been downloaded to any of the Pods 420. That is, when the "Download Path" is set to "Blank" or "Original Download Path" of the file, this indicates that the management file 410 does not contain a description indicating that the file has been downloaded to any of the plurality of Pods 420. In this case, the file is downloaded by referring to the "Download Path" (S12). Specifically, for example, when the initial setting of the "Download Path" is set to the "Original Download Path" of the file, the Pods 420 download the file from the "Original Download Path". Moreover, for example, when the management file 410 includes the "Original Download Path" of the file and the initial setting of the "Download Path" is set to "Blank", the Pods 420 download the file from the "Original Download Path".

The Pod 420 that has already downloaded the file becomes a Leader Pod, and this Pod changes the Download Path in the management file 410 to its own path (S13).

As described above, according to the present embodiment, the Leader Pod that downloaded the file from the Original Download Path of the file stored in the large-scale facility stores this file in its own shared storage. Then, the Leader Pod writes the path of this file stored in its own shared storage into the management file as the Download Path of the file. Thus, each Pod within the same cluster can refer to the management file to download the file from the Leader Pod. This reduces access from the Pods to the large-scale facility, and can prevent repeatedly transferring the same large file from the large-scale facility to each Pod.

The processing by the Pods 420 described in the above embodiment can also be described as a program executable by the Pods. In this case, the program can be stored on a computer-readable non-transitory recording medium and installed onto a computer. Examples of such a recording medium include a portable recording medium such as a CD-ROM, a DVD disk, an USB memory, and a semiconductor memory such as a flash memory.

Note that the present disclosure is not limited to the embodiments described above and includes various modified examples in which constituent elements have been added, removed, or replaced with respect to the configurations described above.

Note that the term "connection" used in the present description refers to a logical connection for the purpose of communication. For example, "B connected to A" means that A and B are logically connected such that communication therebetween is possible. There is no need for A and B to be directly connected in a physical manner by physical cables, etc., and A and B may be connected via multiple devices or by radio communication.

The present disclosure described above includes the following [1] to [13].

[1] A virtual environment system comprising one or more processors, wherein at least one of the one or more processors executes:

a process of downloading, by a first Pod of a plurality of Pods that is capable of managing one or more virtual environments, a file from a first download path written in a management file;

a process of, when a description indicating that the file has been downloaded to any of the plurality of Pods is not included in the management file, changing, by the first Pod, a second download path written in the management file to a path of the first Pod in which the file is stored; and a process of downloading, by a second Pod different from the first Pod of the plurality of Pods, the file from the first Pod by referring to the management file.

[2] The virtual environment system of [1], wherein
the first download path is set to a path in which the file is stored in other than the plurality of Pods.

[3] The virtual environment system of [1] or [2], wherein
when the first Pod satisfies a predetermined requirement, a process of certifying the first Pod to be a responsible Pod for the file is further executed, and
the second download path of the management file is changed to a path of the responsible Pod.

[4] The virtual environment system of any one of [1] to [3], wherein
when the second download path is changed to the path of the first Pod, a process of periodically accessing the management file by the first Pod to write an access time into the management file is further executed,
in a process of downloading the file from the first Pod by the second Pod, a process of determining whether or not the first Pod is operating normally based on the access time is further executed, and
in accordance with the result of determining that the first Pod is operating normally, a process of downloading the file from the first Pod by the second Pod is further executed.

[5] The virtual environment system of [4], wherein
in the process of determining whether or not the first Pod is operating normally based on the access time,
when the first Pod is determined to not to be operating normally, a process of downloading the file from the first download path by the second Pod, and a process of changing the second download path to a path of the second Pod in which the file is stored are further executed.

[6] The virtual environment system of any one of [1] to [5], wherein
when the second download path is changed to the path of the first Pod, a process of confirming the version of the file in the first download path by the first Pod;
when the version of the file stored in the first Pod is older than the confirmed version, a process of downloading the file of the first download path by the first Pod;
a process of writing the confirmed version into the management file by the first Pod; and
when the version of the file downloaded to the second Pod is older than the version of the file written into the management file, a process of downloading the file from the first Pod by the second Pod
are further executed.

[7] The virtual environment system of [6], wherein
in the process of confirming the version of the file of the first download path by the first Pod, a process in which the first Pod inquires the first download path for the latest version of the file is executed.

[8] The virtual environment system of any one of [1] to [7], wherein
a process of receiving the latest version of the file transmitted from the first download path by any of the plurality of Pods is further executed, and
the second download path of the management file is changed to a path of the Pod that received the latest version of the file.

[9] The virtual environment system of any one of [1] to [8], wherein a process of periodically accessing the management file by the first Pod to write an access time into the management file; and when it is determined that the expiration time of the file has passed based on the access time, a process of downloading the file from the first download path by the second Pod are further executed.

[10] The virtual environment system of [3], wherein the predetermined requirement includes a requirement in which a Pod that downloaded the file from an original download path of the file is not a responsible Pod for files separate from the downloaded file.

[11] The virtual environment system of [3], wherein the predetermined requirement includes a requirement in which when a Pod that downloaded the file from the first download path is a responsible Pod for files separate from the downloaded file, the number of the separate files is less than a predetermined number.

[12] A method of managing a virtual environment system, the method comprising:

a process of downloading, by a first Pod of a plurality of Pods that is capable of managing one or more virtual environments, a file from a first download path written in a management file;

a process of, when a description indicating that the file has been downloaded to any of the plurality of Pods is not included in the management file, changing, by the first Pod, a second download path written in the management file to a path of the first Pod in which the file is stored; and a process of downloading, by a second Pod different from the first Pod of the plurality of Pods, the file from the first Pod by referring to the management file.

[13] A non-transitory computer-readable medium having a program recorded therein, wherein the program causes the following processes to be executed:

a process of downloading, by a first Pod of a plurality of Pods that is capable of managing one or more virtual environments, a file from a first download path written in a management file;

a process of, when a description indicating that the file has been downloaded to any of the plurality of Pods is not included in the management file, changing, by the first Pod, a second download path written in the management file to a path of the first Pod in which the file is stored; and a process of downloading, by a second Pod different from the first Pod of the plurality of Pods, the file from the first Pod by referring to the management file.

REFERENCE SIGNS LIST

1 Communication network system
2 Group of providing nodes
7 Interface
8 Base station
9 Information processing device
10 Central data center (CDC)
200, 311 Storage
20 Regional data center (RDC)
30 GC (Group Center)
100 Life Cycle Manager (LCM)
200 Storage
300, 400 Virtual environment system
310 Master node
320 Worker node
330 Deployment controller
340, 420, 420a, 420b, 420c Pod
350 Container
410 Management file

The invention claimed is:

1. A virtual environment system comprising one or more processors, wherein at least one of the one or more processors executes:

a process of downloading, by a first Pod of a plurality of Pods that is capable of managing one or more virtual environments, a file from a first download path written in a management file;

a process of, when a description indicating that the file has been downloaded to any of the plurality of Pods is not included in the management file, changing, by the first Pod, a second download path written in the management file to a path of the first Pod in which the file is stored; and a process of downloading, by a second Pod different from the first Pod of the plurality of Pods, the file from the first Pod by referring to the management file, wherein when the second download path is changed to the path of the first Pod, a process of periodically accessing the management file by the first Pod to write an access time into the management file is further executed, wherein in a process of downloading the file from the first Pod by the second Pod, a process of determining whether or not the first Pod is operating normally based on the access time is further executed, and wherein in accordance with the result of determining that the first Pod is operating normally, a process of downloading the file from the first Pod by the second Pod is further executed.

2. The virtual environment system according to claim 1, wherein the first download path is set to a path in which the file is stored in other than the plurality of Pods.

3. The virtual environment system according to claim 1, wherein when the first Pod satisfies a predetermined requirement, a process of certifying the first Pod to be a responsible Pod for the file is executed, and the second download path of the management file is changed to a path of the responsible Pod.

4. The virtual environment system according to claim 1, wherein in the process of determining whether or not the first Pod is operating normally based on the access time, when the first Pod is determined not to be operating normally, a process of downloading the file from the first download path by the second Pod, and a process of changing the second download path to a path of the second Pod in which the file is stored are further executed.

5. The virtual environment system according to claim 1, wherein when the second download path is changed to the path of the first Pod, a process of confirming a version of the file in the first download path by the first Pod;

when a version of the file stored in the first Pod is older than the confirmed version, a process of downloading the file of the first download path by the first Pod;

a process of writing the confirmed version into the management file by the first Pod; and when a version of the file downloaded to the second Pod is older than a version of the file written into the management file, a process of downloading the file from the first Pod by the second Pod are further executed.

6. The virtual environment system according to claim 5, wherein
in the process of confirming the version of the file of the first download path by the first Pod, a process in which the first Pod inquires the first download path for a latest version of the file is executed.

7. The virtual environment system according to claim 1, wherein
a process of receiving a latest version of the file transmitted from the first download path by any of the plurality of Pods is further executed, and
the second download path of the management file is changed to a path of the Pod that received the latest version of the file.

8. The virtual environment system according to claim 1, wherein
a process of periodically accessing the management file by the first Pod to write an access time into the management file; and
when it is determined that an expiration time of the file has passed based on the access time, a process of downloading the file from the first download path by the second Pod are further executed.

9. The virtual environment system according to claim 3, wherein
the predetermined requirement includes a requirement in which a Pod that downloaded the file from an original download path of the file is not a responsible Pod for files separate from the downloaded file.

10. The virtual environment system according to claim 3, wherein
the predetermined requirement includes a requirement in which when a Pod that downloaded the file from the first download path is a responsible Pod for files separate from the downloaded file, the number of the separate files is less than a predetermined number.

11. A method of managing a virtual environment system, the method comprising:
a process of downloading, by a first Pod of a plurality of Pods that is capable of managing one or more virtual environments, a file from a first download path written in a management file;
a process of, when a description indicating that the file has been downloaded to any of the plurality of Pods is not included in the management file, changing, by the first Pod, a second download path written in the management file to a path of the first Pod in which the file is stored; and
a process of downloading, by a second Pod different from the first Pod of the plurality of Pods, the file from the first Pod by referring to the management file,
wherein when the second download path is changed to the path of the first Pod, a process of periodically accessing the management file by the first Pod to write an access time into the management file is further executed,
wherein in a process of downloading the file from the first Pod by the second Pod, a process of determining whether or not the first Pod is operating normally based on the access time is further executed, and
wherein in accordance with the result of determining that the first Pod is operating normally, a process of downloading the file from the first Pod by the second Pod is further executed.

12. A non-transitory computer-readable medium having a program recorded therein, wherein the program causes the following processes to be executed:
a process of downloading, by a first Pod of a plurality of Pods that is capable of managing one or more virtual environments, a file from a first download path written in a management file;
a process of, when a description indicating that the file has been downloaded to any of the plurality of Pods is not included in the management file, changing, by the first Pod, a second download path written in the management file to a path of the first Pod in which the file is stored; and
a process of downloading, by a second Pod different from the first Pod of the plurality of Pods, the file from the first Pod by referring to the management file,
wherein when the second download path is changed to the path of the first Pod, a process of periodically accessing the management file by the first Pod to write an access time into the management file is further executed,
wherein in a process of downloading the file from the first Pod by the second Pod, a process of determining whether or not the first Pod is operating normally based on the access time is further executed, and
wherein in accordance with the result of determining that the first Pod is operating normally, a process of downloading the file from the first Pod by the second Pod is further executed.

13. The virtual environment system according to claim 1, wherein
the plurality of Pods are configured to operate within a same cluster that manages the one or more virtual environments, and
the file is downloaded by the second Pod within the same cluster from the first Pod.

* * * * *